United States Patent
Nakamura et al.

[11] Patent Number: 6,079,611
[45] Date of Patent: Jun. 27, 2000

[54] METHOD OF MANUFACTURING VENTILATED BRAKE DISC

[75] Inventors: Yasushi Nakamura, Itami; Tetsuo Horibe, Seki, both of Japan

[73] Assignee: Shimano Inc., Osaka, Japan

[21] Appl. No.: 09/220,386

[22] Filed: Dec. 28, 1998

[51] Int. Cl.$^7$ .................................................. B23K 31/02
[52] U.S. Cl. ........................... 228/189; 228/190; 228/231; 228/248.1; 148/528
[58] Field of Search ..................................... 228/189, 190, 228/231, 248.1, 262.42; 148/528, 529

[56] References Cited

U.S. PATENT DOCUMENTS

| | | | |
|---|---|---|---|
| 4,742,948 | 5/1988 | Fisher et al. .............................. | 228/119 |
| 5,358,078 | 10/1994 | Gajek et al. ............................. | 188/72.4 |
| 5,390,771 | 2/1995 | Hinkens et al. .......................... | 188/344 |
| 5,509,510 | 4/1996 | Ihm ..................................... | 188/219 X |
| 5,531,372 | 7/1996 | Bonner et al. ........................... | 228/220 |
| 5,626,211 | 5/1997 | Gewelber et al. .................. | 188/218 X |

OTHER PUBLICATIONS

Brochure of *Hayes Brake, Inc.*; Three catalog pages. Prior to Dec. 1998.

*Primary Examiner*—Samuel M. Heinrich
*Attorney, Agent, or Firm*—Shinjyu Global IP Counselors, LLP

[57] ABSTRACT

A method of manufacturing a stainless steel ventilated brake disc is provided that results in a relatively inexpensive stainless steel ventilated brake disc. In manufacturing the ventilated brake disc a pair of annular plate members are provided that are constructed of stainless steel. Then a spacing member constructed of stainless steel is inserted between the inner axially facing surfaces of the first and second annular plate members. A nickel bonding paste is applied at the points of contact between the spacing member and the inner axially facing surfaces of the first and second annular plate members. Heat is now applied to the spacing member and the annular plate members as a combined unit with the nickel bonding paste applied thereto. This heating of the assembled unit austenitizes the spacing member and the annular plate members and simultaneously bonds the spacing member to the inner axially facing surfaces of the annular plate members.

20 Claims, 6 Drawing Sheets

METHOD OF MANUFACTURING VENTILATED BRAKE DISC

BACKGROUND OF THE INVENTION

1. Field of the Invention

This invention generally relates to a method of manufacturing a ventilated brake disc. More specifically, the present invention relates a method of manufacturing a ventilated brake disc from stainless steel.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. In particular, bicycle components are constantly becoming lighter with increased performance. One particular component of the bicycle, which has been extensively redesigned over the past years, is the braking systems of bicycles.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions.

However, one problem with disc brakes is that the hydraulic or actuating fluid can become overheated such that vapor-lock occurs. In other words, the heat generated by braking results in the hydraulic fluid increasing in volume so as to cause the brake pads to engage the brake disc even when the brake lever is in the release position. When vapor-lock occurs, the bicycle wheels can lock up and throw the rider off of the bicycle. Accordingly, it is important to design a disc brake system that avoids or minimizes vapor-lock.

In the prior art disc brake systems, several methods have been utilized to avoid vapor-lock. For example, the caliper housing can be made larger to absorb more heat. Another method has been to make a larger brake disc with a wider surface area. Also, vapor-lock can be suppressed by utilizing high quality hydraulic fluid. Yet another method to avoid vapor-lock has been to use brake or friction pads which do not transfer the heat to the brake housing as readily as conventional friction pads. These prior art methods of avoiding vapor-lock have many problems. One particular problem is that these solutions often are expensive to manufacture. Moreover, some of these prior art solutions result in a heavier braking system. Also, some of these prior art solutions are not completely effective.

In view of the above, there exists a need for a method of manufacturing a ventilated brake disc from stainless steel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a method of manufacturing a ventilated brake disc from stainless steel that is relatively inexpensive to manufacture.

Another object of the present invention is to provide a method of manufacturing a ventilated brake disc from stainless steel that is relatively simple to manufacture.

Another object of the present invention is to provide a method of manufacturing a ventilated brake disc, comprising the steps of providing first and second annular plate members constructed of stainless steel and having inner axially facing surfaces; inserting a spacing member constructed of stainless steel between the inner axially facing surfaces of the first and second annular plate members; applying a nickel bonding paste at points of contact between the spacing member and the inner axially facing surfaces of the first and second annular plate members; and heating the spacing member and the first and second annular plate members as a combined unit with the nickel bonding paste applied thereto to its austenitize the spacing member and the first and second annular plate members and to simultaneously bond the spacing member to the inner axially facing surfaces of the first and second annular plate members.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
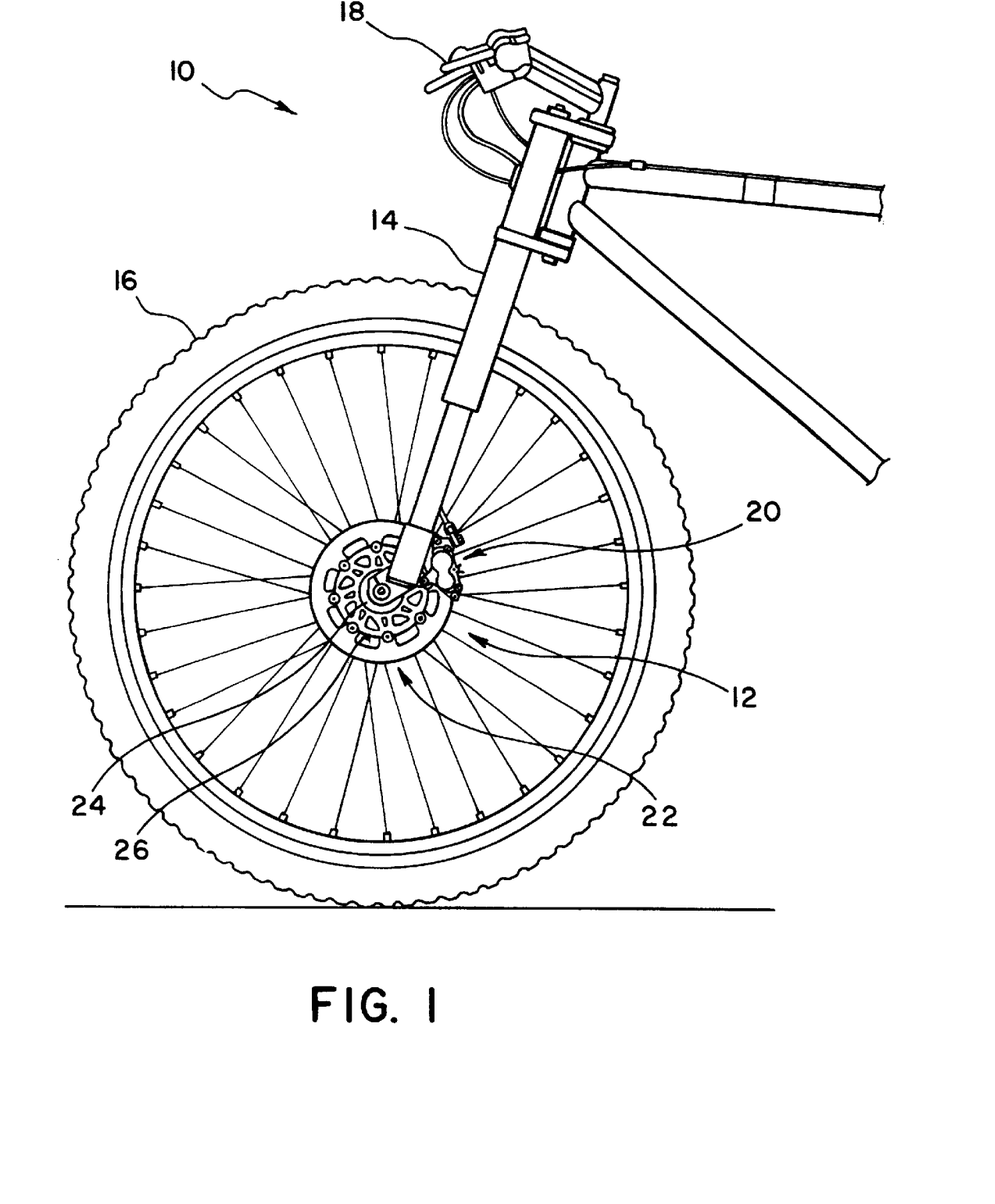
FIG. 1 is a partial side elevational view of a portion of a bicycle with a bicycle disc brake assembly coupled thereto in accordance with one embodiment of the present invention.

Referring initially to FIG. 1, a front portion of a bicycle 10 is illustrated with a disc brake assembly 12 coupled thereto in accordance with one embodiment of the present invention. Bicycles, such as bicycle 10, are well known in the art, and thus, bicycle 10 and its various components will not be discussed or illustrated in detail herein. It will be apparent to those skilled in the art that bicycle 10 can be any type of bicycle, e.g., a mountain bike, a hybrid bike or a road bike. Bicycle 10 is a conventional bicycle with disc brake assembly 12 coupled to the front fork 14 for selectively stopping the rotation of wheel 16.

While only the front portion of bicycle 10 is illustrated as having a disc brake assembly 12, it will be apparent to those skilled in the art from this disclosure that a second disc brake assembly 12 can be utilized for stopping the rear wheel of bicycle 10. Moreover, it will be apparent to those skilled in the art from this disclosure that various changes and modifications can be made from the embodiments disclosed herein without departing from the scope of the invention as defined in the appended claims.

Figure 2:
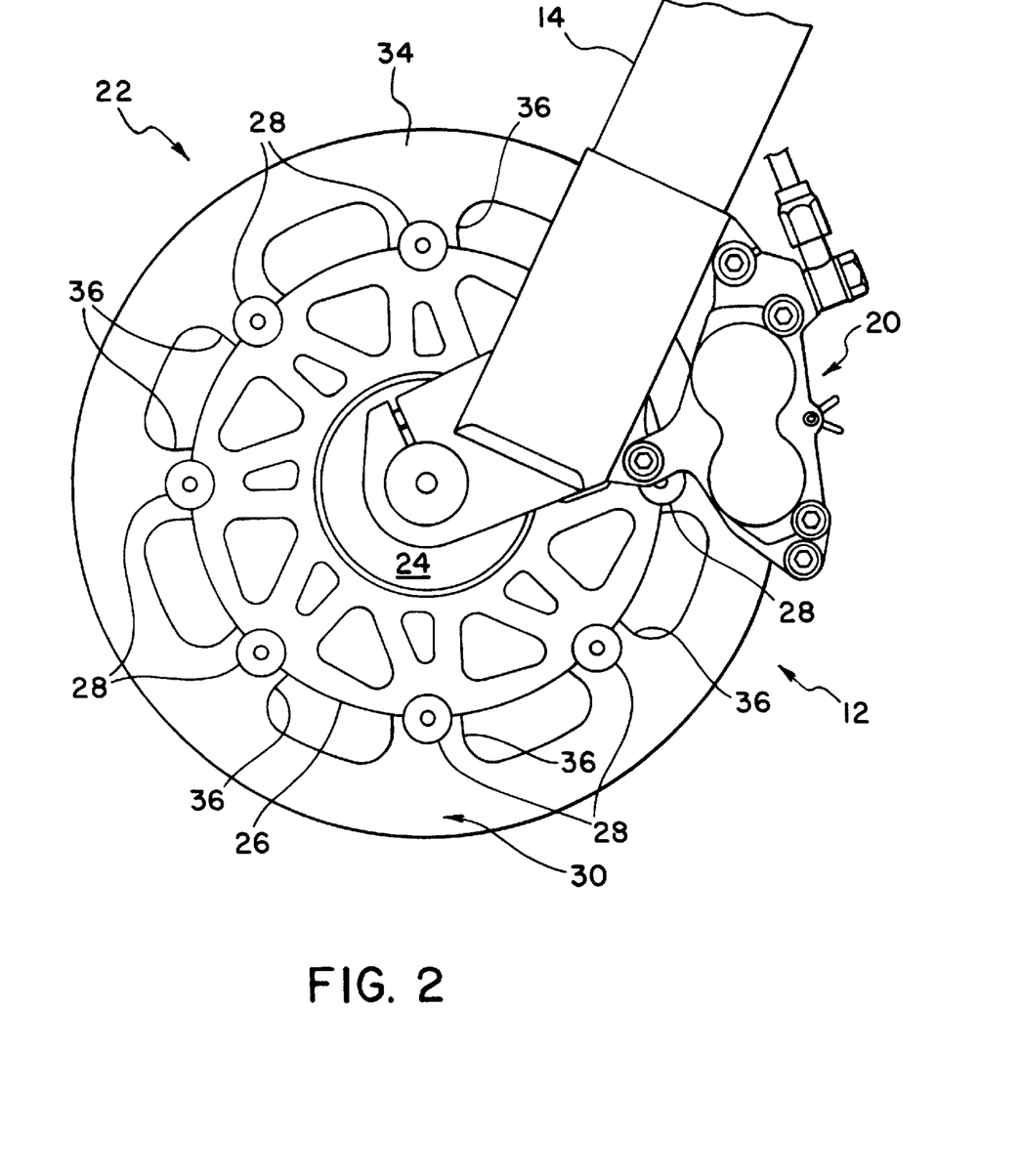
FIG. 2 is an enlarged partial side elevational view of the disc brake and brake disc coupled to the front fork of the bicycle illustrated in FIG. 1.

As best seen in FIG. 2, disc brake assembly 12 basically includes a brake lever 18, a disc brake caliper 20 operatively coupled to brake lever 18 and a brake disc 22. Disc brake caliper 20 is fixedly coupled to fork 14 of bicycle 10, while brake disc 22 is fixedly coupled to hub 24 of wheel 16. Disc brake caliper 20 can be any type of disc brake caliper which is designed to apply a clamping force to stop rotation of the bicycle wheel 16 via brake disc 22. Since brake disc calipers such as brake disc caliper 20 are well known in the art, brake disc caliper 20 will not be discussed or illustrated in detail herein.

Brake disc 22 is a ventilated brake disc, which is basically comprised of three components that are coupled to hub 24 of wheel 16 via a disc support member 26. More specifically, eight fasteners 28 are used to releasably couple brake disc 22 to disc support member 26. The precise connection between brake disc 22 and disc support member 26 is not critical to the present invention. Thus, the connection between brake disc 22 and disc support member 26 will not be discussed in further detail herein.

Basically, as seen in FIGS. 3–6, brake disc 22 has a pair of annular plate members 30 with a spacing member 32 coupled therebetween. Annular plate members 30 are bonded to spacing member 36 via a bonding paste. For example, the bonding paste is a nickel bonding paste (Japanese Industrial Standard: BNi-4). When annular plate members 30 are coupled to spacing member 32, a plurality of radially extending vents are formed between annular plate members 30.

Figure 3:
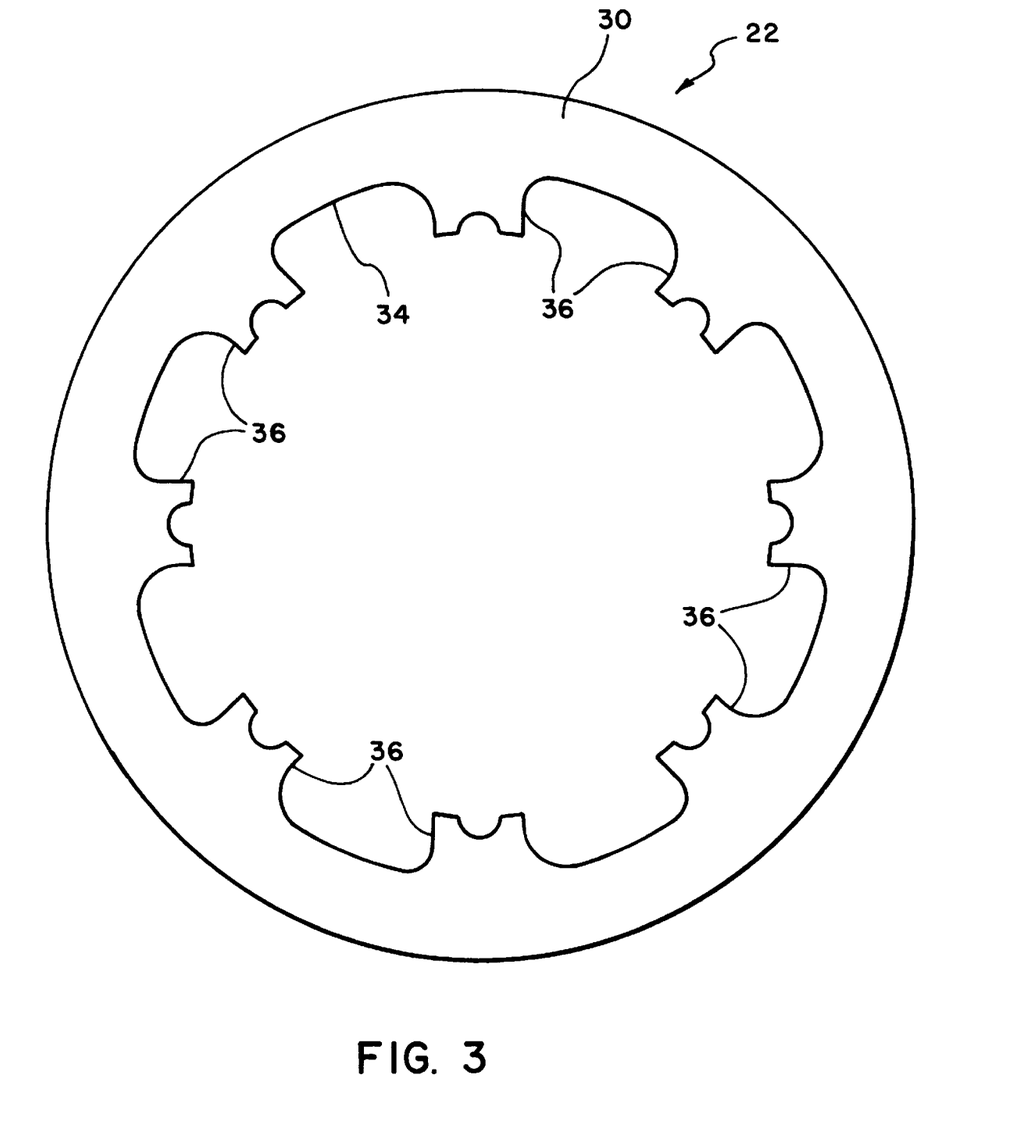
FIG. 3 is a side elevational view of the ventilated brake disc utilized in the disc brake assembly illustrated in FIG. 1 in accordance with one embodiment of the present invention.
Figure 4:
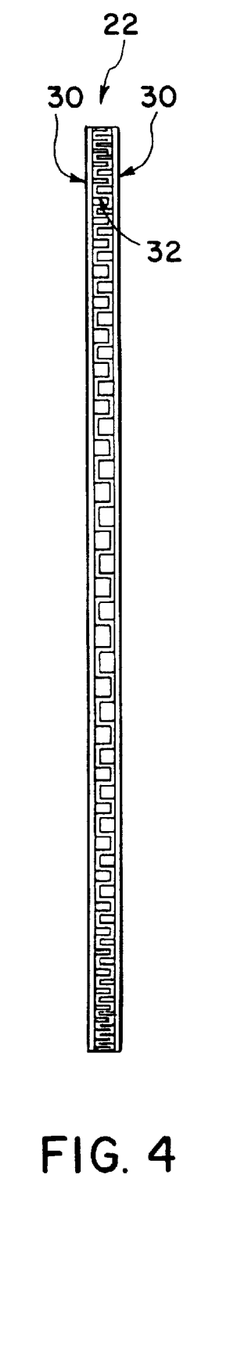
FIG. 4 is an edge elevational view of the ventilated brake disc illustrated in FIG. 3 in accordance with one embodiment of the present invention.

In the preferred embodiment, annular plate members 30 are substantially identical to each other in construction. Of course, it will be apparent to those skilled in the art from this disclosure that the shapes of the two plate members 30 could be slightly different, as needed and/or desired.

Annular plate members 30 are constructed of stainless steel so that they will not rust or corrode when utilized with bicycle 10. As best seen in FIGS. 2 and 3, each of the annular plate members 30 includes a circular ring-shaped portion 34 with eight mounting elements 36 extending radially towards the axis of ring portion 34. The number and/or shape of mounting elements 36 will depend upon the precise structure of the disc support member 26. Therefore, it will be apparent to those skilled in the art from this disclosure that the number and/or shape of mounting elements 36 can be varied depending upon the disc support member 26. Preferably, ring portion 34 has an outer diameter of approximately 165 mm, and an inner diameter of approximately 135 mm. The preferred thickness of ring portion 34 is preferably approximately 0.8 mm±0.05 mm.

In order to couple plate members 30 to spacing member 32, the ring portion 34 of each of the plate members 30 can be coated with the nickel bonding paste. Of course, other types of bonding paste which act as a catalyst to carry out the manufacture of the brake disc 22 in accordance with the present invention can also be utilized. The bonding paste can be spot coated onto ring portions 34 or uniformly coated over the entire surface of ring portions 34 as needed and/or desired.

Referring now to FIGS. 4–7, spacing member 32 of brake disc 22 acts as a ventilated disc core for the annular plate members 30. Annular plate members 30 are attached to spacing member 32 at the inner axially facing surfaces of annular plate members 30. Preferably, spacing member 32 is constructed of stainless steel as a onepiece, unitary member. While spacing member 32 is illustrated as a continuous, ringshaped member, it would be apparent to those skilled in the art from this disclosure that spacing member 32 could be constructed of several sections to form a discontinuous ring-shaped member. Preferably, the outer and inner diameters of spacing member 32 are substantially identical to the inner and outer diameters of ring portions 34 of plate members 30. Of course, these diameters can vary if needed and/or desired.

Figure 5:
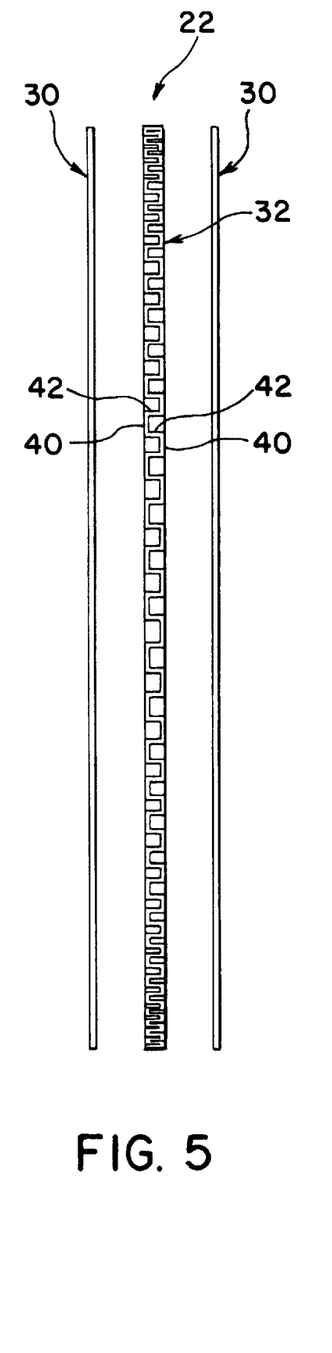
FIG. 5 is an exploded edge elevational view of the ventilated brake disc illustrated in FIGS. 3 and 4 in accordance with one embodiment of the present invention.
Figure 7:
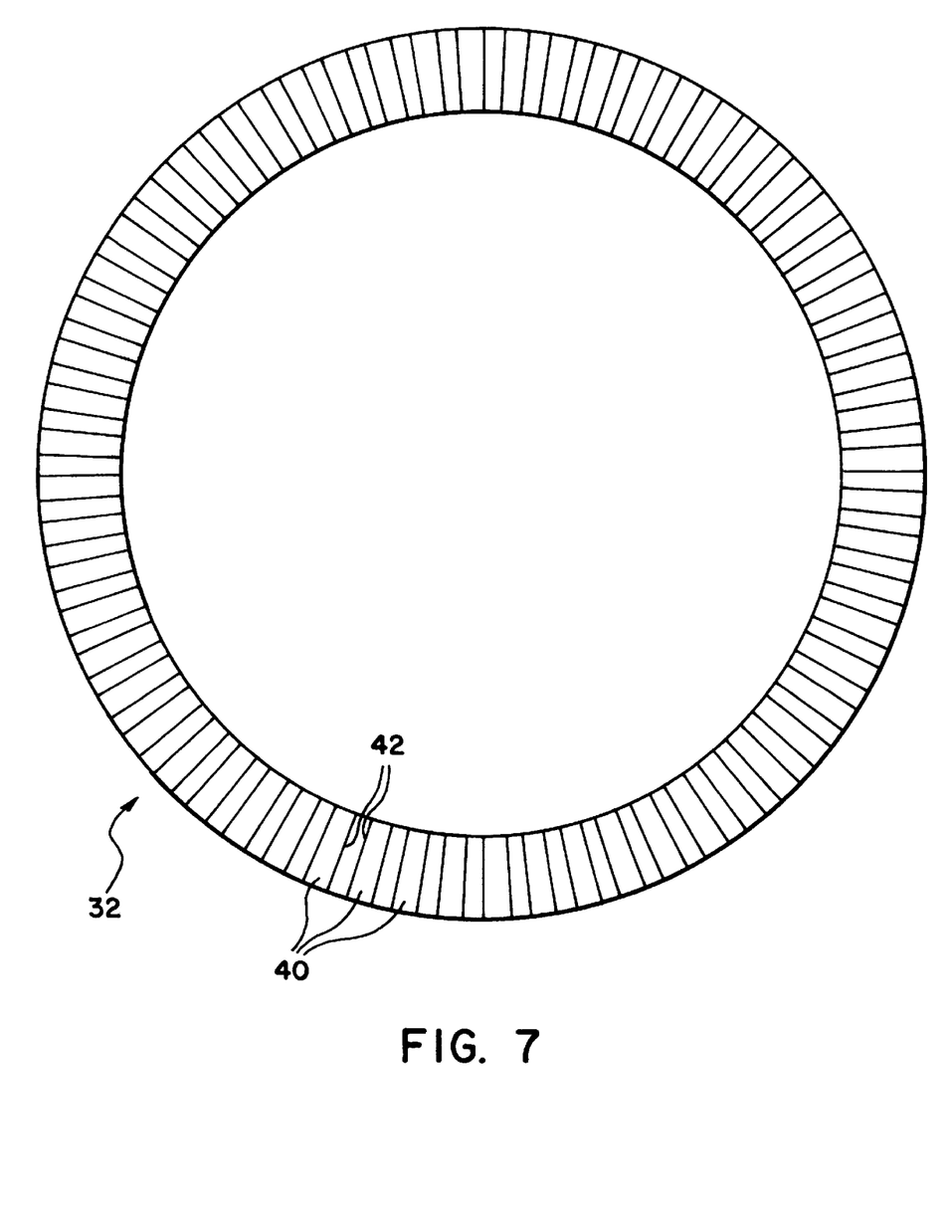
FIG. 7 is a side elevational view of the spacer member which is utilized in the ventilated brake disc illustrated in FIGS. 1–6 in accordance with one embodiment of the present invention.

As best seen in FIGS. 5 and 7, spacing member 32 is constructed of a sheet material that is corrugated, e.g., wrinkled or folded in such a manner to form alternating ridges and grooves. In the preferred embodiment, spacing member 32 is corrugated so as to form a plurality of flat bonding portions 40 connected by a plurality of spacing portions 42. The flat bonding portions 40 alternate for bonding to opposite portions of plate members 30. In other words, bonding portions 40 face axially with the bonding surface of each of the bonding portions 40 facing in the opposite direction to the adjacent bonding portions 40. Spacing portions 42 preferably extend substantially axially between bonding portions 40. Preferably, the overall thickness of spacing member 32 between the outer facing axial surfaces between opposite bonding portions 40 is approximately 3.2 mm. The thickness of the plate member forming the corrugated spacing member 32 is initially approximately 0.6 mm. Accordingly, when annular plate members 30 are bonded to spacing members 32, the resulting ventilated brake disc 22 has an overall thickness of approximately 4.8 mm±0.15 mm.

Figure 6:
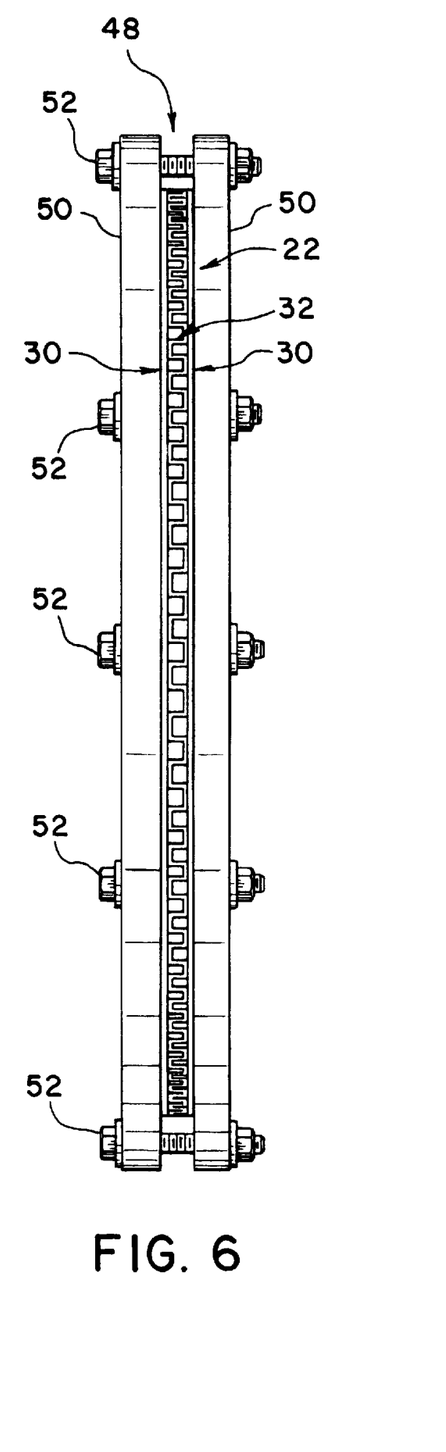
FIG. 6 is a side elevational view of the ventilated brake disc illustrated in FIGS. 1–5, in a clamping member.

Turning now to the method of manufacturing brake disc 22, annular plate members 30 are stamped from stainless steel sheet material or casted from stainless steel. Likewise, the spacer member 32 is stamped and/or bent from stainless steel sheet material or casted from stainless steel. The bonding portions 40 and/or the ring portions 34 are coated with a thin film of nickel bonding paste. The spacing member 32 is then placed between the inner facing axial surfaces of plate members 30 such that the bonding portions 40 face plate members 30. The three components, plate members 30 and spacing member 32, are coupled together in a clamping unit 48 as seen in FIG. 6, such that the bonding portions 40 of spacing member 32 firmly contact the inner axial surfaces of annular plate members 30. For example, as seen in FIG. 6, the spacing member 30 and the plate members 32 can be placed between a pair of support plates 50, which are squeezed towards each other by bolts 52 to apply a clamping pressure between annular plate member 30 and spacing member 32. Of course, other types of mechanisms can be used instead of the clamping unit 48, which is illustrated in FIG. 6.

Now, the combined unit 48 of the spacing member 32 and the annular plate members 30 are subjected to a heat treatment process to harden brake disc 22 and a single unit. The resulting brake disc 22 or unit will be an integral ventilated brake disc 22, which is substantially less costly to manufacture than a casted or machined brake disc with radially extending vents. During the heat treatment process, the clamping unit 48, with the spacing member 32 and the annular plate members 30 held therein, is subjected to heat for simultaneously bonding and hardening plate members 30 and spacing member 32.

Figure 8:
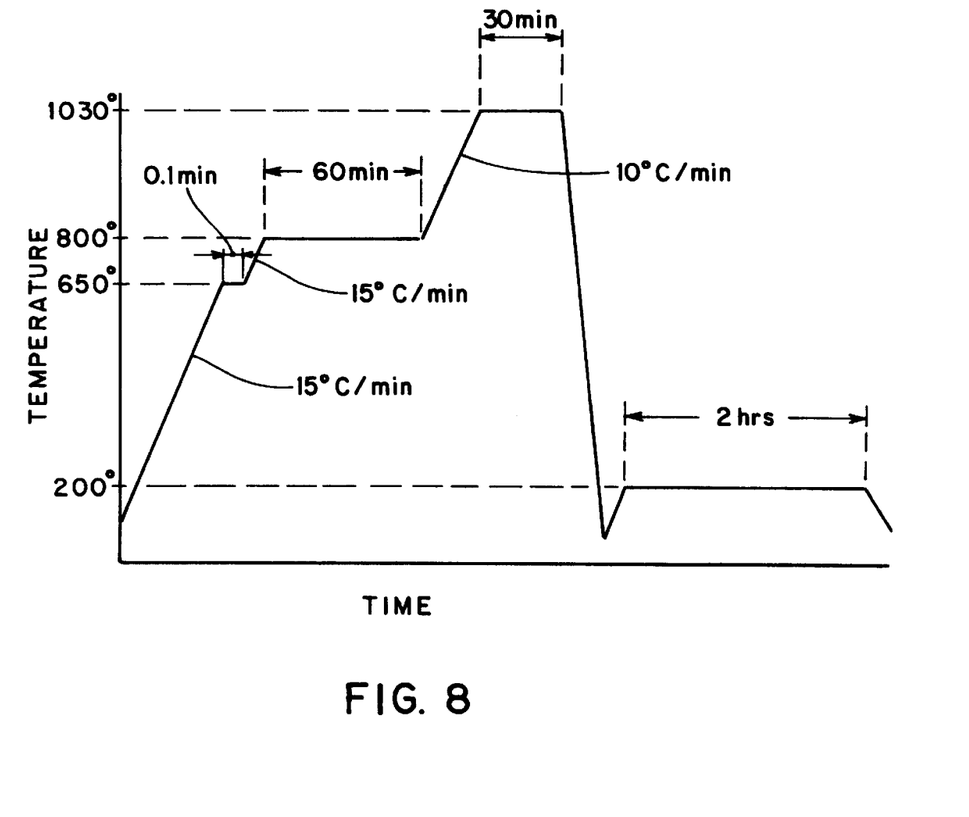
FIG. 8 is a chart illustrating the heat treatment for manufacturing the ventilated brake disc illustrated in FIGS. 3–6.

Preferably, the clamping unit 48 together with brake disc 22 are subjected to heat in three stages for predetermined periods of time. First, the clamping unit 48 and brake disc 22 are both subjected to heat at the rate of approximately 15° C. per minute until the heat reaches approximately 650° C. The clamping unit 48 and disc brake 22 are maintained at approximately 650° C. for approximately 0.1 minute. Then, the heat is increased at a rate of 15° C. per minute to approximately 800° C. The clamping unit 48 and disc brake 22 are subjected to 800° C. for approximately sixty minutes. Next, the heat is increased at a rate of 10° C. per minute until the heat reaches approximately 1000° C., preferably approximately 1030° C. The clamping unit 48 and disc brake 22 are then subjected to approximately 1000° C. to approximately 1030° C. for approximately 30 minutes. This heating process will cause the crystal structure of the stainless steel of the plate members 30 and the spacing member 32 to austenitize. Of course, other temperatures and heating times can be utilized to carry out the present invention.

Accordingly, after this heating process, the stainless steel of the annular plate members 30 and the spacing member 32 will be harder than before the heating process. Moreover, the bonding paste will act as a catalyst causing the metal of the bonding portions 40 of the spacing member 32 to fuse with the metal of the inner axial facing surfaces of plate members 30. In other words, the bonding paste acts as a catalyst for bonding the spacing member 32 to the annular plate members 30.

After the disc brake 22 has been hardened, the disc brake 22 is rapidly cooled or quenched to lock in the new structure of the stainless steel. In this state, the intermediate structure of the brake disc 22 is somewhat brittle. To decrease the brittleness of the brake disc 22, the brake disc 22 is tempered by re-heating the brake disc 22 to approximately 200° C. for approximately 2 hours. The brake disc 22 is then cooled to form essentially an integral, one-piece member.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A method of manufacturing a ventilated brake disc, comprising the steps of:
   providing first and second annular plate members constructed of stainless steel and having inner axially facing surfaces;
   inserting a spacing member constructed of stainless steel between said inner axially facing surfaces of said first and second annular plate members;
   applying a nickel bonding paste at points of contact between said spacing member and said inner axially facing surfaces of said first and second annular plate members; and
   heating said spacing member and said first and second annular plate members as a combined unit with said nickel bonding paste applied thereto to austenitize said spacing member and said first and second annular plate members and to simultaneously bond said spacing member to said inner axially facing surfaces of said first and second annular plate members.

2. A method of manufacturing a ventilated brake disc according to claim 1, wherein
   said spacing member is a ring-shaped member having alternating ridges and grooves.

3. A method of manufacturing a ventilated brake disc according to claim 2, wherein
   said ring-shaped member is a continuous member.

4. A method of manufacturing a ventilated brake disc according to claim 1, wherein
   said combined unit is subjected to approximately 1030° C. during said heating.

5. A method of manufacturing a ventilated brake disc according to claim 4, wherein
   said combined unit is quenched after being subjected to said heating.

6. A method of manufacturing a ventilated brake disc according to claim 5, wherein
   said combined unit is reheated after said quenching for tempering said spacing member and said first and second annular plate members.

7. A method of manufacturing a ventilated brake disc according to claim 6, wherein
   said tempering occurs at approximately 200° C.

8. A method of manufacturing a ventilated brake disc according to claim 7, wherein
   said tempering occurs for approximately two hours.

9. A method of manufacturing a ventilated brake disc according to claim 6, wherein
   said spacing member is a ring-shaped member having alternating ridges and grooves.

10. A method of manufacturing a ventilated brake disc according to claim 9, wherein
    said ring-shaped member is a continuous member.

11. A method of manufacturing a ventilated brake disc according to claim 6, wherein
    said spacing member is a one-piece, unitary member.

12. A method of manufacturing a ventilated brake disc according to claim 11, wherein
    said first and second annular plate members are each a one-piece, unitary member.

13. A method of manufacturing a ventilated brake disc according to claim 1, wherein
    at least one of said first and second annular plate members has mounting elements for coupling said combined unit to a hub.

14. A method of manufacturing a ventilated brake disc according to claim 13, wherein
    said first and second annular plate members are substantially identical.

15. A method of manufacturing a ventilated brake disc according to claim 1, wherein
    said spacing member has first flat portions which are bonded to said first annular plate and second flat portions which are bonded to second annular plate during said heat.

16. A method of manufacturing a ventilated brake disc according to claim 1, wherein said heating occurs in at least two different temperature stages which are maintained for predetermined periods of time.

17. A method of manufacturing a ventilated brake disc according to claim 1, wherein said heating occurs in at least three different temperature stages for predetermined periods of time.

18. A method of manufacturing a ventilated brake disc according to claim 1, wherein said combined unit is quenched after being subjected to said heating.

19. A method of manufacturing a ventilated brake disc according to claim 18, wherein said combined unit is reheated after said quenching for tempering said spacing member and said first second annular plate members.

20. A method of manufacturing a ventilated brake disc according to claim 19, wherein said spacing member is a one-piece, unitary member.

\* \* \* \* \*